United States Patent
Chen et al.

(10) Patent No.: US 9,502,899 B2
(45) Date of Patent: Nov. 22, 2016

(54) METHOD AND APPARATUS FOR POWER PLANT DYNAMIC VAR REGULATION AND TRANSIENT STABILITY IMPROVEMENT

(71) Applicant: ABB Schweiz AG, Baden (CH)

(72) Inventors: Yao Chen, Beijing (CN); Guoju Zhang, Beijing (CN); Charles Sao, Vasteras (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/413,084

(22) PCT Filed: Apr. 28, 2013

(86) PCT No.: PCT/CN2013/074983
§ 371 (c)(1),
(2) Date: Jan. 6, 2015

(87) PCT Pub. No.: WO2014/094402
PCT Pub. Date: Jun. 26, 2014

(65) Prior Publication Data
US 2015/0162749 A1 Jun. 11, 2015

(30) Foreign Application Priority Data

Dec. 20, 2012 (WO) ................ PCT/CN2012/087001

(51) Int. Cl.
*G05F 1/70* (2006.01)
*H02J 3/18* (2006.01)
(Continued)

(52) U.S. Cl.
CPC ............ *H02J 3/1821* (2013.01); *G05B 15/02* (2013.01); *G05F 1/70* (2013.01); *H02J 3/18* (2013.01);
(Continued)

(58) Field of Classification Search
CPC ........ H02J 3/1814; H02J 3/1821; H02J 3/18; Y02E 40/30; Y02E 40/12; Y02E 40/18; G05F 1/70; H02P 9/30; H02P 9/14; G05B 15/02
USPC .................................................. 323/205–211
See application file for complete search history.

(56) References Cited

U.S. PATENT DOCUMENTS

| 5,710,492 A | 1/1998 | Konishi et al. |
| 7,688,043 B2 * | 3/2010 | Toki ..................... H02J 3/1864 323/210 |

(Continued)

FOREIGN PATENT DOCUMENTS

| CN | 101222142 A | 7/2008 |
| CN | 102299527 A1 | 12/2011 |

(Continued)

OTHER PUBLICATIONS

ISA/CN International Search Report issued Oct. 3, 2013 re PCT Application No. PCT/CN2013/074983, filed Apr. 28, 2013.

(Continued)

*Primary Examiner* — Adolf Berhane
*Assistant Examiner* — Alex Torres-Rivera
(74) *Attorney, Agent, or Firm* — Robert A. Jefferis; Driggs, Hogg, Daugherty & Del Zoppo Co., LPA

(57) ABSTRACT

Method and apparatus for controlling at least one generator and a Static Var Compensator (SVC) to improve dynamic performance of the power plant are provided. The method comprises: obtaining the required input parameters for control of said generators and SVC; determining a control mode of the generators and the SVC; calculating the control references based on the input parameters and the control mode of the generators and the SVC; and controlling the generators and/or the SVC according to the control references. The invention also relates to a corresponding apparatus which can implement the method of the invention.

16 Claims, 6 Drawing Sheets

(51) Int. Cl.
*G05B 15/02* (2006.01)
*H02P 9/14* (2006.01)
*H02P 9/30* (2006.01)

(52) U.S. Cl.
CPC ............... *H02J 3/1814* (2013.01); *H02P 9/14* (2013.01); *H02P 9/30* (2013.01); *Y02E 40/12* (2013.01); *Y02E 40/18* (2013.01)

(56) References Cited

U.S. PATENT DOCUMENTS

| | | | |
|---|---|---|---|
| 2005/0012339 A1* | 1/2005 | Mikhail | H02J 3/383 290/44 |
| 2008/0157728 A1 | 7/2008 | Toki | |
| 2009/0206606 A1* | 8/2009 | Jorgensen | F03D 7/0224 290/44 |
| 2011/0181044 A1 | 7/2011 | Scott et al. | |
| 2012/0139506 A1* | 6/2012 | Matsuda | H02J 3/1878 323/210 |
| 2012/0179301 A1* | 7/2012 | Aivaliotis | H02J 3/00 700/286 |
| 2012/0205981 A1* | 8/2012 | Varma | H02J 3/01 307/64 |

FOREIGN PATENT DOCUMENTS

| | | |
|---|---|---|
| CN | 101924371 B | 7/2012 |
| CN | 102769299 A1 | 11/2012 |
| WO | WO2012055115 A1 | 5/2012 |

OTHER PUBLICATIONS

Extended European Search Report issued Aug. 4, 2016 re Application No. EP13865504.8 of ABB Technology Ltd.

* cited by examiner

METHOD AND APPARATUS FOR POWER PLANT DYNAMIC VAR REGULATION AND TRANSIENT STABILITY IMPROVEMENT

CROSS REFERENCE TO RELATED APPLICATION

This application claims the benefit of and priority to PCT International Application No. PCT/CN2012/087001, which was filed on Dec. 20, 2012 and is entitled "Coordinated generator and SVC control for power plant active power throughput improvement". The complete disclosure of the above-identified patent application is incorporated herein by reference.

FIELD OF THE INVENTION

Embodiments of the present invention generally relate to power plant, and more particularly, to a method and apparatus for power plant dynamic reactive power regulation and transient stability improvement.

BACKGROUND OF INVENTION

In the new scenario of electrical energy competition and ancillary services market, it has grown the need and interest in developing and applying suitable real-time control systems for the grid voltages and reactive powers regulation. The portion of power flow that result in a net transfer of energy in one direction is known as real power (or useful or active power). That portion of power flow that is due to stored energy in the load returning to the source in each cycle is known as reactive power. Apparent power is the vector sum of real and reactive power.

The power factor is defined as the ratio of real power to apparent power. This definition is often mathematically represented as kW/kVA, where the numerator is the active (real) power and the denominator is the active and reactive power or apparent power. Power factor equals one when the voltage and current are in phase, and is zero when the current leads or lags the voltage by 90 degrees. If the load is purely reactive, then the voltage and current are 90 degree out of phase and there is no net energy flow.

For two AC power systems transmitting the same amount of real power, the system with the lower power factor will have higher circulating currents due to energy that returns to the source from energy storage in the load. These higher currents in a power system will produce higher losses and reduce overall transmission efficiency. A lower power factor circuit will have a higher apparent power and higher losses for the same amount of real power transfer. Thus, it is desirable to maintain a high power factor in an AC power system.

Reactive power, however, is necessary to maintain adequate voltage levels on a power grid. Without such voltage support, the transfer and distribution of real power would be adversely affected. For this reason, a transmission operator often requires a power generator to provide a certain amount of reactive power in order to connect a power grid run by the transmission operator. Typically, the provision of such required reactive power reduces the amount of real power that a power generator could otherwise supply and reduce the power factor of the power generated by the power generator.

The present invention proposes a novel solution to overcome such drawback by installing Static Var Compensator (SVC) at the generation side of the power plant to improve the power plant's active power throughput capability, extend dynamic reactive power regulation capacity, and enhance generator transient stability under system disturbances.

The concept of installing SVC at the generation side to share the required reactive power output of the power plant has been disclosed in U.S. Patent Application Publication No. US2011/181044 A1.

The present invention is directed to the method and apparatus for power plant dynamic reactive power regulation and transient stability improvement.

SUMMARY OF INVENTION

Particular embodiments of the subject matter described in this specification can be implemented so as to realize one or more of the following advantages.

In one aspect, embodiments of the present invention provide a method controlling at least one generator and a Static Var Compensator (SVC) to improve dynamic performance of the power plant, the method comprising: obtaining one or more required input parameters for control of said generators and SVC; determining a control mode of the generators and the SVC; calculating one or more control references based on the input parameters and the control mode of the generators and the SVC; and controlling the generators and/or the SVC according to the control references.

The method according the present invention comprises three control modes. The method comprises a first control mode to realize unity power factor operation of multiple generator units with different operating points; a second control mode for power plant dynamic reactive power regulation without undesired internal reactive power consumption; and a third control mode for improving the transient stability of the power plant under system disturbances.

In some embodiments, the first control mode comprises the steps of: using said SVC to control the high side voltage of the unit transformer according to the high side voltage reference from high level control centers; calculating the feed forward components for terminal voltage references $V^*_{G\_FF\_i}$ of different generator units based on the same high side voltage reference for SVC; calculating the feedback components for terminal voltage references of different generator units based on closed-loop control to remove potential measurement errors or parameter errors; and using the excitation systems of said generators to control the terminal voltage of generator units according to the terminal voltage references.

In some embodiments, the closed-loop control further comprises the steps of: getting an output which inputs to PI block according to the i-th generator reactive power $Q_{Gen\_i}$ and the i-th generator reactive power reference $Q^*_{Gen\_i}$; outputting the feed back components for terminal voltage references of the i-th generator unit $V^*_{G\_FB\_i}$ from PI block to an adder for combining the feed forward components for terminal voltage reference of the i-th generator unit $V^*_{G\_FF\_i}$ and the feed back components for terminal voltage reference of the i-th generator unit $V^*_{G\_FB\_i}$ to form a new voltage reference of the i-th generator unit $V^*_{G\_i}$.

In some embodiments, the second control mode comprising the steps of: determining the reactive power reference of the power plant according to the demand of the power system; determining the respective reactive power reference of the generators and the SVC; using the SVC to control the high side voltage of unit transformer to respond to the SVC reactive power reference; and using the excitation systems of said generators to control the terminal voltage of generator units to respond to the generators reactive power reference.

In some embodiments, determining the reactive power reference of the power plant according to the demand of the power system further comprising: calculating an available reactive power capacity of the power plant which includes generators and SVC; and limiting the power plant reactive power output reference according to the reactive power available capacity.

In some embodiments, determining the respective reactive power reference of the generators and the SVC further comprising: identifying whether the SVC is able to meet the power plant reactive power reference; calculating SVC reactive power reference if the SVC can meet the power plant reactive power reference alone; and calculating generator reactive power references and SVC reactive power reference if the SVC can not meet the power plant reactive power reference alone.

In some embodiments, the third method comprises the steps of: identifying a swing direction of a disturbance which the generators suffer; using bang-bang reactive power control for the SVC when the power plant is under the disturbance of a forward swing; and using voltage control and calculating incremental high side voltage reference for said SVC to realize Power Oscillation Damping (POD) when the generators are under disturbance of backward swing.

In some embodiments, the method which is under the third control mode further comprises adding additional POD components into generator terminal voltage references for excitation systems in order to improve the damping torque during backward swings.

In another aspect, an apparatus is provided to implement various embodiments of the method of the first aspect of the invention. The controller comprises: an obtaining module configured to obtain one or more required input parameters for control of said generators and SVC; a determining module configured to determine a control mode of the generators and the SVC; a calculating module configured to calculate one or more control references based on the input parameters and the control mode of the generators and the SVC; and a controlling module configured to control the generators and/or the SVC according to the control references.

Wherein the control mode of the controller comprises: a first control mode to realize unity power factor operation of multiple generator units with different operating points; a second control mode for power plant dynamic reactive power regulation without undesired internal reactive power consumption; a third control mode for improving the transient stability of the power plant under system disturbances.

In some embodiments, when the controller is under the first control mode, the controlling module configured to use said SVC to control the high side voltage of the unit transformer according to the high side voltage reference from high level control centers of the power system; the calculating module configured to: calculate the feed forward components for terminal voltage references $V^*_{G\_FF\_i}$ of different generator units based on the same high side voltage reference for SVC and calculate feedback components for terminal voltage references of different generator units based on closed-loop control to remove potential measurement errors or parameter errors; and the controlling module configured to use the excitation systems of said generators to control the terminal voltage of generator units according to the terminal voltage references.

In some embodiments, when the controller is under the first control mode, for the closed-loop control, the calculating module further configured to: get an output which inputs to PI block according to the i-th generator reactive power $Q_{Gen\_i}$ and the i-th generator reactive power reference $Q^*_{Gen\_i}$; and output the feed back components for terminal voltage references of the i-th generator unit $V^*_{G\_FB\_i}$ from PI block to an adder for combining the feed forward components for terminal voltage reference of the i-th generator unit $V^*_{G\_FF\_i}$ and the feed back components for terminal voltage reference of the i-th generator unit $V^*_{G\_FB\_i}$ to form a new voltage of the i-th generator unit $V^*_{G\_i}$.

In some embodiments, when the controller is under the second control mode, the calculating module configured to: determine the reactive power reference of the power plant according to the demand of the power system and determine the respective reactive power reference of the generators and the SVC; and the controlling module configured to use the SVC to control the high side voltage of unit transformer to respond to the SVC reactive power reference and use the excitation systems of said generators to control the terminal voltage of generator units to respond to the generators reactive power reference.

In some embodiments, when the calculating module further configured to: calculate an available reactive power capacity of the power plant which includes generators and SVC; and limit the power plant reactive power output reference according to the reactive power available capacity.

In some embodiments, the calculating module further configured to: identify whether the SVC is able to meet the power plant reactive power reference; calculate SVC reactive power reference if the SVC can meet the power plant reactive power reference alone; and calculate generator reactive power references and SVC reactive power reference if the SVC can not meet the power plant reactive power reference alone.

In some embodiments, when the controller is under the third control mode, the obtaining module configured to identify a swing direction of a disturbance which the generators suffer; and the controlling module configured to: use bang-bang reactive power control for the SVC when the power plant is under the disturbance of a forward swing and use voltage control for said SVC to realize Power Oscillation Damping (POD) when the generators are under disturbance of backward swing.

In some embodiments, when the controller is under the third control mode, said controlling module configured to add additional POD components into generator terminal voltage references for excitation systems in order to improve the damping torque during backward swings.

In the embodiments of the present invention, the SVC comprises Thyristor Controlled Reactor (TCR), Thyristor Switched Capacitor (TSC), and/or IGBT/IGCT based Static Synchronous Compensator (STATCOM).

Other features and advantages of embodiments of the present invention will also be understood from the following description of specific exemplary embodiments when read in conjunction with the accompanying drawings, which illustrate, by way of example, the principles of the invention.

BRIEF DESCRIPTION OF DRAWINGS

Embodiments of the present invention will be presented in the sense of examples and their advantages are explained in greater detail below, with reference to the accompanying drawings, wherein.

All the figures are schematic, not necessarily to scale, and generally only show parts which are necessary in order to elucidate the invention, wherein other parts may be omitted or merely suggested.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The SVC used herein comprises Thyristor Controlled Reactor (TCR), Thyristor Switched Capacitor (TSC), and/or IGBT/IGCT based Static Synchronous Compensator (STATCOM)

Figure 1:
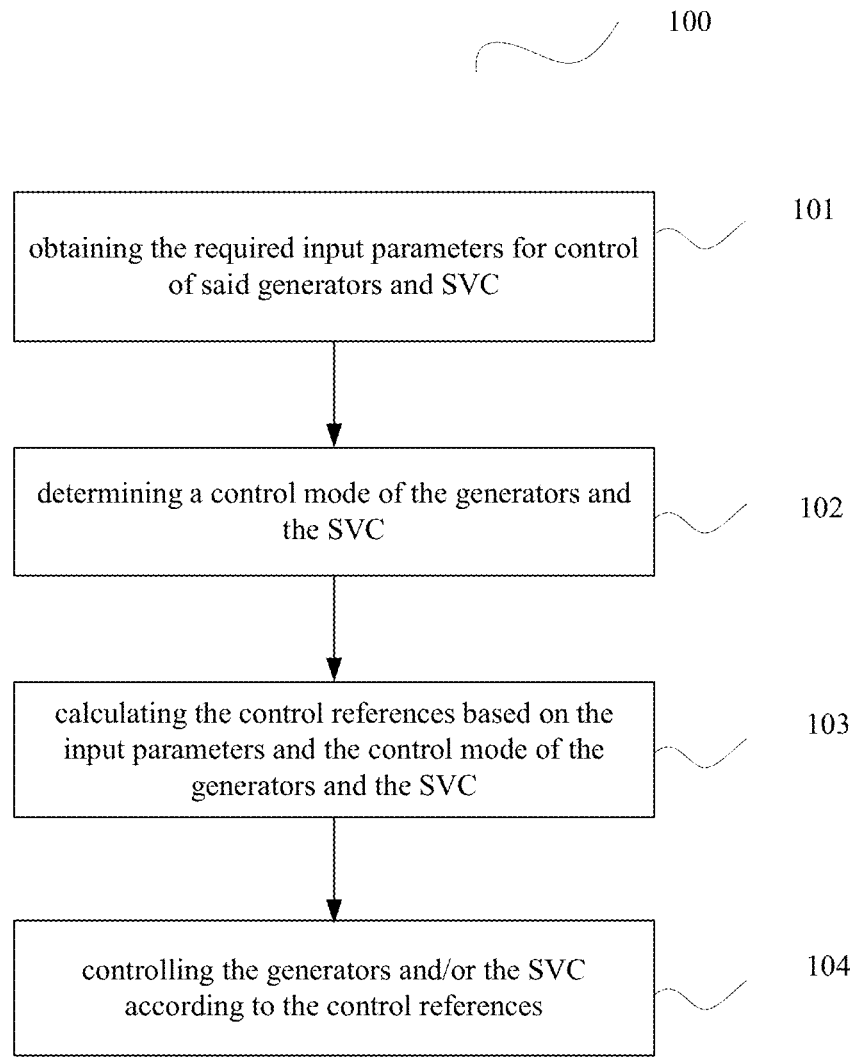
FIG. 1 shows a method for improving dynamic performance of the power plant according to embodiments of the present invention.

FIG. 1 shows a method for improving dynamic performance of the power plant according to embodiments of the present invention. The concept of installing SVC at the generation side to share the required reactive power output of the power plant has been disclosed in PCT Application No. PCT/US2011/181044 and in U.S. (provisional) Patent Application No. 61/297,672 which are incorporated herein by reference.

As shown in FIG. 1, a method for controlling generator and Static Var Compensator (SVC) to improve dynamic performance of the power plant is provided.

At the step 101, the method 100 obtains the required input parameters for control of said generators and SVC. The input parameters can be different in various cases.

At the step 102, the method 100 determines a control mode of the generators and the SVC. The method comprising three control modes: a first control mode to realize unity power factor operation of multiple generator units with different operating points; a second control mode for regulating the power plant dynamic reactive power without undesired internal reactive power consumption; and a third control mode for improving the transient stability of the power plant under system disturbances.

The first control mode and the second control mode can be selected by the operator of the power plant according to the dispatch requirement from the utility. The third control mode will be triggered automatically whenever a system disturbance is detected. After disturbance clearance, the controller will return back to the previous control mode.

At the step 103, the method 100 calculates the control references based on the input parameters and the control mode of the generators and the SVC. The control references can be different in various cases and be determined based on the control mode.

Then the method 100 proceeds to the step 104. At the step 104, the method controls the generators and/or the SVC according to the control references.

Figure 2:
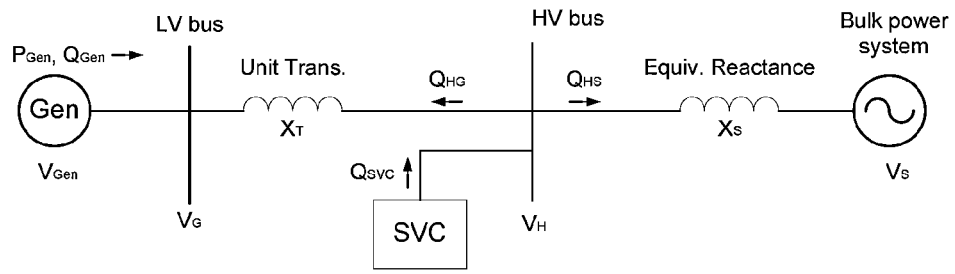
FIG. 2 illustrates an equivalent circuit of the power system when SVC is connected to the HV bus in accordance with an exemplary embodiment of the present invention.

FIG. 2 illustrates an equivalent circuit of the power system when SVC is connected to the HV side of the unit transformer in accordance with an exemplary embodiment of the present invention;

When SVC is connected to the HV bus of the power system, the equivalent circuit of the system is shown in FIG. 2, where $P_{Gen}$ and $Q_{Gen}$ are the active and reactive power output from the generator; $Q_{SVC}$ is the reactive power output from the SVC. As shown in FIG. 2, the reactive power output from SVC can be divided into two parts, $Q_{HG}$ and $Q_{HS}$, wherein $Q_{SVC} = Q_{HG} + Q_{HS}$; $X_T$ and $X_S$ respectively represent the reactance of unit transformer and equivalent reactance of the transmission system; $V_{Gen}$ and $V_H$ respectively represent the generator terminal voltage and the unit transformer high side voltage; and $V_S$ represents the voltage of the bulk power system.

Given the equivalent circuit, the active and the reactive power from the generator can be expressed as equation (1), where δ represents the phase angle of the generator terminal voltage with respect to the unit transformer HV bus voltage.

$$\begin{cases} P_{Gen} = \dfrac{V_G V_H}{X_T} \sin\delta \\ Q_{Gen} = \dfrac{V_G^2}{X_T} - \dfrac{V_G V_H}{X_T} \cos\delta \end{cases} \quad \text{Equation (1)}$$

Since $\cos\delta = \sqrt{1-\sin^2\delta}$, the expression of reactive power $Q_{Gen}$ can be obtained as follows:

$$Q_{Gen} = \dfrac{V_G^2 - \sqrt{V_G^2 V_H^2 - P_{Gen}^2 X_T^2}}{X_T} \quad \text{Equation (2)}$$

In order to fully compensate the reactive power output from the generator, $Q_{Gen}$ should be equal to zero, i.e. there will be no reactive power exchange between the generator and the unit transformer, which means the reactive power demand of the unit transformer should be balanced by $Q_{HG}$. Thus we have equation (3):

$$V_H = \sqrt{V_G^2 + \left(\frac{P_{Gen} X_T}{V_G}\right)^2} \quad \text{Equation (3)}$$

If the SVC is in voltage control mode, the voltage reference can then be calculated by using $V^*_{SVC} = V^*_H$.

However, this method is not suitable for power plant with multiple generator units, because it's not possible to keep all the generators operate at the same terminal voltage level and power level. Therefore, an improvement has been made that is to calculate the feed forward components for terminal voltage references of different generator units based on the same high side voltage reference for SVC, as shown in equation (4), wherein subscript i indicate variables for the i-th generator.

$$V^*_{G\_FF\_i} = \sqrt{\frac{\left(\begin{array}{c} V_H^{*2} + 2Q^*_{Gen\_i} X_{T\_i} + \\ \sqrt{(V_H^{*2} + 2Q^*_{Gen\_i} X_{T\_i})^2 - } \\ 4P^2_{Gen\_i} X^2_{T\_i} - 4Q^{*2}_{Gen\_i} X^2_{T\_i} \end{array}\right)}{2}} \quad \text{Equation (4)}$$

Wherein $V^*_{G\_FF\_i}$ represents the feed forward components for terminal voltage references of the i-th generator unit, $P^*_{Gen\_i}$ represents the active power reference of the i-th generator unit, $Q^*_{Gen\_i}$ represents the reactive power reference of the i-th generator unit, $X_{T\_i}$ represents the equivalent reactance of unit transformer for the i-th generator unit, $V_H$ represent the voltage of the HV side.

When $Q^*_{Gen\_i} = 0$, we can simplify equation (4) as below $$V^*_{G\_FF\_i} = \sqrt{(V^{*2}_H + \sqrt{V^{*4}_H - 4P^{*2}_{Gen\_i} X^2_{T\_i}})/2} \quad \text{Equation (5)}$$

To overcome the potential measurement errors or parameter errors, closed-loop control is also needed to calculate the feedback component. If use PI closed-loop control, the feedback component for terminal voltage reference can be calculated as equation (6).

$$V^*_{F\_FB\_i} = k_p(Q^*_{Gen\_i} - Q_{Gen\_i}) + k_i \int (Q^*_{Gen\_i} - Q_{Gen\_i}) dt \quad \text{Equation (6)}$$

Wherein $k_p$ and $k_i$ are constant factor based on the closed-loop control, $V^*_{G\_FB\_i}$ represents the feed back components for terminal voltage references of the i-th generator unit, $Q^*_{Gen\_i}$ represents the reactive power reference of the i-th generator unit, and $Q_{Gen\_i}$ represents the reactive power of the i-th generator unit.

In some embodiments, the closed-loop can be PID control or other closed-loop control which is known to the skilled in this art.

Figure 3:
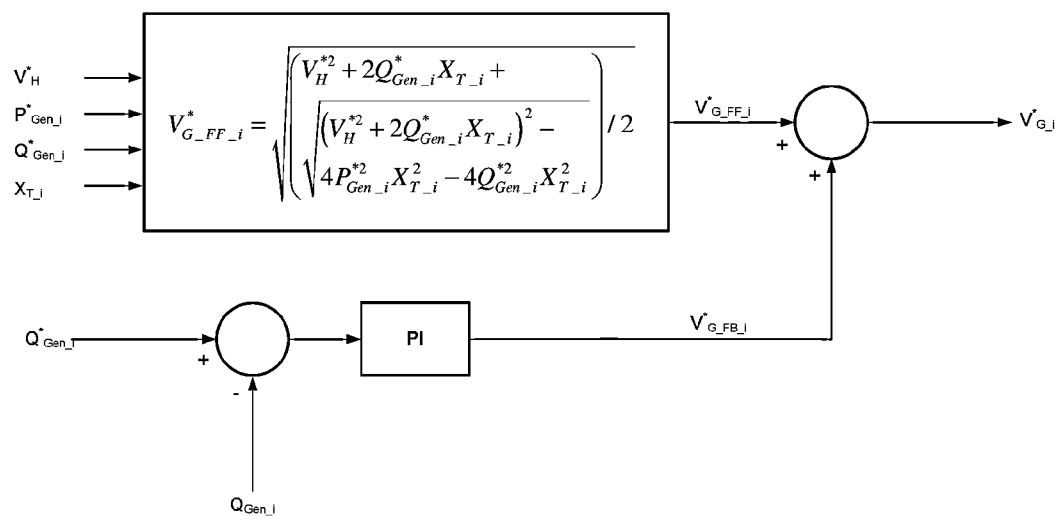
FIG. 3 illustrates a diagram of coordinated generators and SVC control system according to a preferred embodiment of the present invention according to an embodiment of the present invention.

FIG. 3 illustrates a diagram of coordinated generators and SVC control system according to a preferred embodiment of the present invention according to an embodiment of the present invention.

As shown in FIG. 3, the SVC is under voltage control mode according to an embodiment of the invention. The control system receives the voltage reference of the HV side $V^*_H$, the active power reference of the i-th generator unit $P^*_{Gen\_i}$, the reactive power reference of the i-th generator unit $Q^*_{Gen\_i}$, and the equivalent reactance of unit transformer for the i-th generator unit $X_{T\_i}$. Then the control system obtains the feed forward components for terminal voltage references of the i-th generator unit $V^*_{G\_FF\_i}$ which is calculated according to equation (4) or (5).

In FIG. 3, the control system further subtracts generator reactive power $Q^*_{Gen\_i}$ from the generator reactive power reference $Q^*_{Gen\_i}$ to get an output which inputs to PI block, and outputs the feed back components for terminal voltage references of the i-th generator unit $V^*_{G\_FB\_i}$ from PI block to an adder for combining the feed forward components for terminal voltage references of the i-th generator unit $V^*_{G\_FF\_i}$ and the feed back components for terminal voltage references of the i-th generator unit $V^*_{G\_FB\_i}$ to form a new voltage reference of the i-th generator unit $V^*_{G\_i}$. Use the voltage reference of the i-th generator unit $V^*_{G\_i}$ to control the i-th generator unit.

Figure 4:
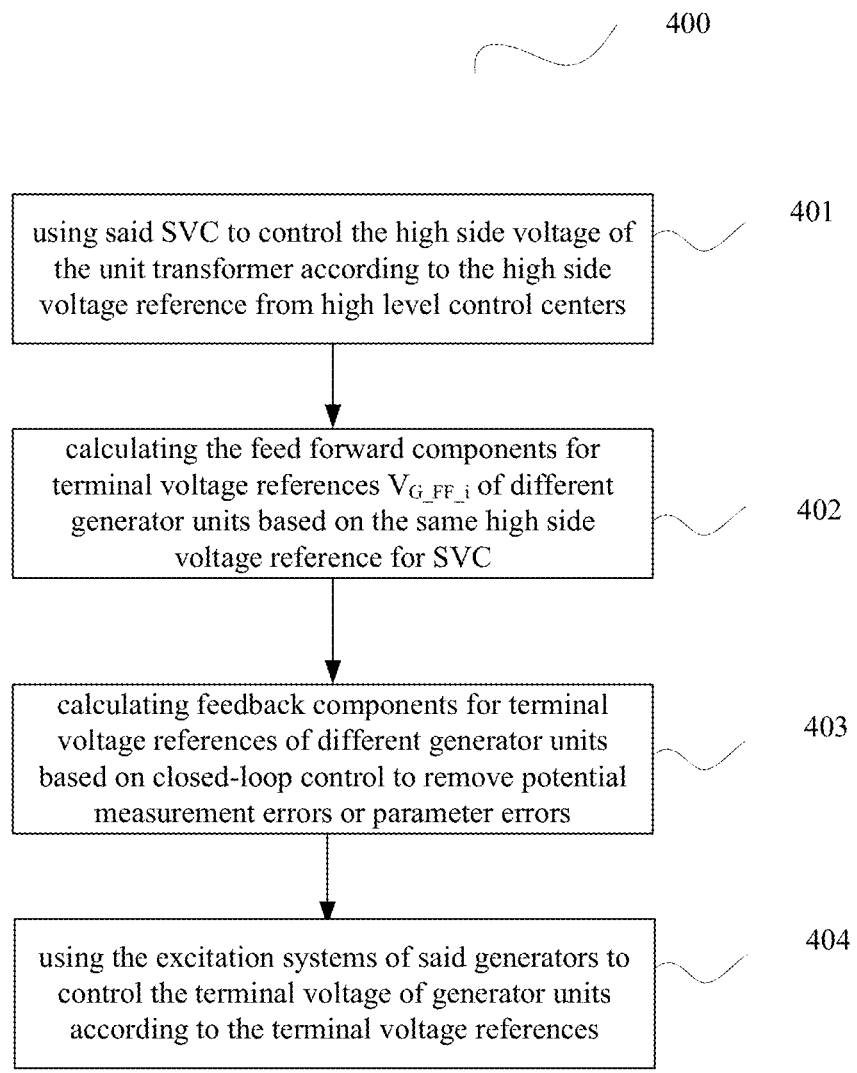
FIG. 4 shows the first control mode of the control method for improving dynamic performance of the power plant according to an embodiment of the present invention.

FIG. 4 shows the first control mode of the control method for improving dynamic performance of the power plant according to an embodiment of the present invention.

The control method as shown in FIG. 4 can realize unity power factor operation of multiple generator units with different operating points. At the step 401, the method uses the SVC to control the high side voltage of the unit transformer according to the high side voltage reference from high level control centers.

At the step 402, the control method calculates the feed forward components for terminal voltage references $V^*_{G\_FF\_i}$ of different generator units based on the same high side voltage reference for SVC.

At the step 403, the control method 400 calculates the feedback components for terminal voltage references of different generator units based on closed-loop control to remove potential measurement errors or parameter errors. In some embodiments, the closed loop control comprises the steps of: getting an output which inputs to PI block according to the i-th generator reactive power $Q_{Gen\_i}$ and the i-th generator reactive power reference $Q^*_{Gen\_i}$, and outputting the feed back components for terminal voltage references of the i-th generator unit $V^*_{G\_FB\_i}$ from PI block to an adder for combining the feed forward components for terminal voltage references of the i-th generator unit $V^*_{G\_FF\_i}$ and the feed back components for terminal voltage references of the i-th generator unit $V^*_{G\_FB\_i}$ to form a new voltage reference of the i-th generator unit $V^*_{G\_i}$.

At the step 404, the control method 400 uses the excitation systems of said generators to control the terminal voltage of generator units according to the terminal voltage references. The excitation system is well known to the skilled in the art. So the principle how the excitation systems control the terminal voltage of the generator is omitted herein.

Figure 5:
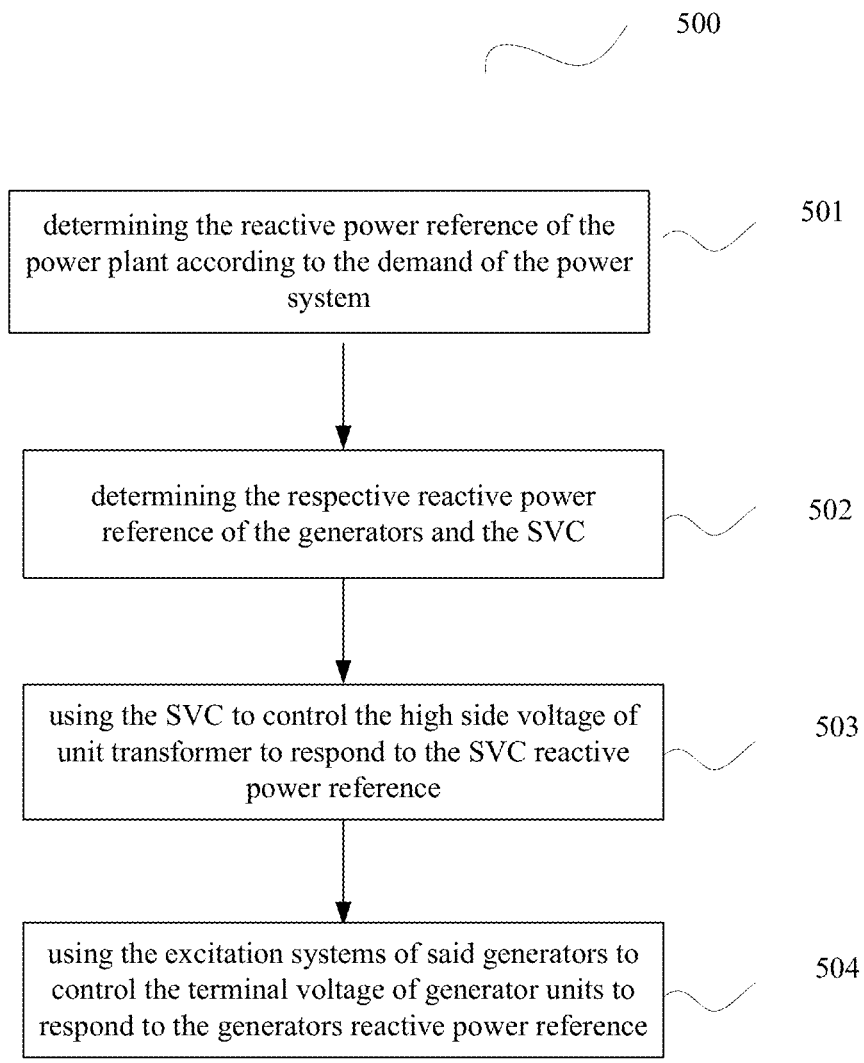
FIG. 5 shows the second control mode of the control method of the second mode for improving dynamic performance of the power plant according to another embodiment of the present invention.

FIG. 5 shows the second control mode of the control method for improving dynamic performance of the power plant according to another embodiment of the present invention.

The control method as shown in FIG. 5 can be used for power plant dynamic reactive power regulation without undesired internal reactive power consumption.

There are cases that utilities need more reactive power support from the power plant, e.g. reactive power ancillary service (RPAS), which requires the power plant to output certain amount more reactive power within given time. With SVC installed at the Point of Common Coupling (PCC), the dynamic reactive power capability of power plant is extended considerably and therefore offers a better opportunity to participate in RPAS.

The operation principle of power plant reactive power regulation includes two aspects: the first is that SVC works as a main source for power plant reactive power regulation, and the generators work as the backup source when SVC reaches maximum output; and the other is that it needs coordination between the generator excitation system and the SVC to avoid undesired internal reactive power consumption.

To realize this benefit, coordinated control strategy between the generator excitation system and the SVC is needed to firstly respond to utility reactive power command at power plant PCC point, and secondly share reactive power output between the generator and SVC.

At the step 501, the method 500 determines the reactive power reference of the power plant according to the demand of the power system. The demand of the power system received from the higher control center of the power system determines the total reactive power output of the power plant containing the generators and SVC.

In some embodiments, determining the reactive power reference of the power plant according to the demand of the power system further comprises the steps of: calculating an available reactive power capacity of the power plant which includes generators and SVC; and limiting the power plant reactive power output reference according to the reactive power available capacity.

The maximum inductive and capacitive reactive power of the power plant can be calculated as equation (7).

$$Q_{PP\_L\,max} = Q_{SVC\_L} + \sum_i Q_{Gen\_Li} \qquad \text{Equation (7)}$$

$$Q_{PP\_C\,max} = Q_{SVC\_C} + \sum_i Q_{Gen\_Ci}$$

Wherein the $Q_{PP\_L\_max}$ represents the maximum inductive reactive power of the power plant, $Q_{SVC\_L}$ represents the maximum inductive reactive power of the SVC, $Q_{Gen\_Li}$ represents the maximum inductive reactive power of the i-th generator unit. The $Q_{PP\_Cmax}$ represents the maximum capacitive reactive power of the power plant, $Q_{SVC\_C}$ represents the maximum capacitive reactive power of the SVC, $Q_{Gen\_Ci}$ represents the maximum capacitive reactive power of the i-th generator unit.

The power reference of the power plant can be determined by equation (8).

$$Q^{*\prime}_{Plant} = \begin{cases} Q^*_{Plant}, & Q_{PP\_L\,max} < Q^*_{Plant} < Q_{PP\_C\,max} \\ Q_{PP\_C\,max}, & Q^*_{Plant} > Q_{PP\_C\,max} \\ Q_{PP\_L\,max}, & Q^*_{Plant} < Q_{PP\_L\,max} \end{cases} \qquad \text{Equation (8)}$$

When the reactive power reference of the power plant $Q^*_{Plant}$ is higher than the maximum inductive reactive power of the power plant, and lower than the maximum capacitive reactive power of the power plant, the new reactive power reference of the power plant $Q^{*\prime}_{Plant}$ is equal to the reactive power reference of the power plant $Q^*_{Plant}$. When the reactive power reference of the power plant $Q^*_{Plant}$ is higher than the maximum capacitive reactive power of the power plant, the new reactive power reference of the power plant $Q^{*\prime}_{Plant}$ is equal to the maximum capacitive reactive power of the power plant. When the reactive power reference of the power plant $Q^{*\prime}_{Plant}$ is lower than the maximum inductive reactive power of the power plant, the new reactive power reference of the power plant $Q^{*\prime}_{Plant}$ is equal to the maximum inductive reactive power of the power plant.

At the step 502, the method 500 determines the respective reactive power reference of the generators and the SVC.

In some embodiments, determining the respective reactive power reference of the generators and the SVC further comprises the steps of: identifying whether the SVC is able to meet the power plant reactive power reference; calculating SVC reactive power reference if the SVC can meet the power plant reactive power reference alone; and calculating generator reactive power references and SVC reactive power reference if the SVC can not meet the power plant reactive power reference alone.

In some embodiments, if the SVC can not cover the reactive power requirement, there can be one or more generators sharing the left reactive power which is equal to the total reactive power subtracting the maximum reactive power capacity of the SVC. One way of the sharing way of the generators can be several ones sharing the left reactive power with others not sharing any power, and the other way can be all the generator units sharing the left reactive power at the ratio.

In some embodiments, the i-th reactive power reference of the generator units can be determined by equation (9).

$$Q^*_{Gen\_i} = \begin{cases} 0, & Q_{SVC\_L} < Q^{*\prime}_{Plant} < Q_{SVC\_C} \\ \dfrac{Q_{Gen\_Ci}}{\sum_i Q_{Gen\_Ci}}(Q^{*\prime}_{Plant} - Q_{SVC\_C}), & Q^{*\prime}_{Plant} > Q_{SVC\_C} \\ \dfrac{Q_{Gen\_Li}}{\sum_i Q_{Gen\_Li}}(Q^{*\prime}_{Plant} - Q_{SVC\_L}), & Q^{*\prime}_{Plant} < Q_{SVC\_L} \end{cases} \qquad \text{Equation (9)}$$

When the new reactive power reference of the power plant $Q^{*\prime}_{Plant}$ is higher than the maximum inductive reactive power of the SVC, and lower than the maximum capacitive reactive power of the SVC, the reactive power of the i-th generator unit is equal to zero. When the new reactive power reference of the power plant $Q^{*\prime}_{Plant}$ is higher than the maximum capacitive power of the SVC, the reactive power of the i-th generator unit is equal to the ratio multiplying the result of the new reactive power reference of the power plant $Q^{*\prime}_{Plant}$ subtracting the maximum capacitive power of the SVC, wherein the ratio is that the maximum capacitive reactive power of the i-th generator unit divided by the total maximum capacitive reactive power of all the generator units. When the new reactive power reference of the power plant $Q^{*\prime}_{Plant}$ is lower than the maximum inductive power of the SVC, the reactive power of the i-th generator unit is equal to the ratio multiplying the result of the new reactive power reference of the power plant $Q^{*\prime}_{Plant}$ subtracting the maximum inductive power of the SVC, wherein the ratio is that the maximum inductive reactive power of the i-th generator unit divided by the total maximum inductive reactive power of all the generator units.

Then the method 500 proceeds to the step 503. At the step 503, the method 500 uses the SVC to control the high side voltage of unit transformer to respond to the SVC reactive power reference. The new voltage reference of the SVC can be calculated by equation (10)

$$V^{*\prime}_{SVC} = V^*_{SVC} + \Delta V^*_H = V^*_H + k'_p(Q^{*\prime}_{Plant} - Q_{Plant}) + k'_i \int (Q^{*\prime}_{Plant} - Q_{Plant}) dt \qquad \text{Equation (10)}$$

Wherein $k'_p$ and $k'_i$ is constant value determined by the closed-loop control, the new power reference of the power plant $Q^{*'}_{Plant}$ can be obtained from equation (8), $Q_{Plant}$ is the measured reactive power of the power plant.

At the step 504, the method 500 uses the excitation systems of said generators to control the terminal voltage of generator units to respond to the generators reactive power reference.

In some embodiments, the i-th voltage reference $V_{G\_i}^*$ can be calculated by equation (11).

$$V_{G\_i}^* = \sqrt{\frac{\left(V_H^{*'2} + 2Q_{Gen\_i}^* X_{T\_i} + \sqrt{(V_H^{*'2} + 2Q_{Gen\_i}^* X_{T\_i})^2 - 4P_{Gen\_i}^{*2} X_{T\_i}^2 - 4Q_{Gen\_i}^{*2} X_{T\_i}^2}\right)}{2}} \quad \text{Equation (11)}$$

Wherein $V_{G\_i}^*$ the voltage references of the i-th generator unit, $P^*_{Gen\_i}$ represents the active power reference of the i-th generator unit, $Q^*_{Gen\_i}$ represents the reactive power reference of the i-th generator unit, $X_{T\_i}$ represents the equivalent reactance of unit transformer for the i-th generator unit, $V^{*'}_T$ represent the new voltage reference of the HV bus which can be determined by equation (12).

$$V^{*'}_H = V^{*'}_{SVC} = V^*_H + \Delta V^*_H \quad \text{Equation (12)}$$

Wherein the incremental high side voltage reference $\Delta V_H^*$ can be calculated through the power plant reactive power closed-loop control according to equation (10).

Figure 6:
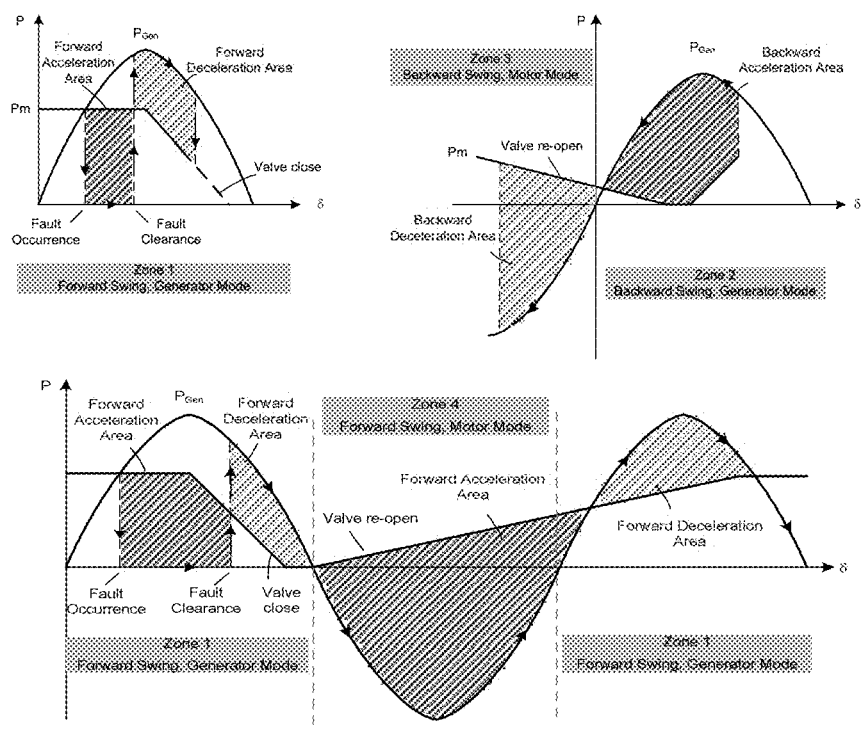
FIG. 6 shows the operation principle for the transient stability of the power plant according to embodiments of the present invention.

FIG. 6 shows the operation principle for the transient stability of the power plant according to embodiments of the present invention.

The basic principle of the generator transient stability improvement is to change the power-angle characteristics of the generator under disturbances, to reduce excessive energy caused by the difference of mechanical power and electromagnetic power, so as to improve first swing stability and provide better damping for the consequent power swings.

As illustrated in FIG. 6, wherein Pm is the mechanical power of the prime mover, δ is the power angle of generator; fast valving is assumed here for prime mover control under disturbances. $P_{Gen}$ is the electrical power of the generator. For synchronization, when the forward swing happens, $P_{Gen}$ should be increased in Zone 1 to enlarge the forward deceleration area; and $P_{Gen}$ should be decreased in Zone 4 to reduce the forward acceleration area. For oscillation damping, when the backward swing happens, $P_{Gen}$ should be decreased in Zone 2 to reduce the backward acceleration area; and $P_{Gen}$ should be increased in Zone 3 to enlarge the backward deceleration area.

Figure 7:
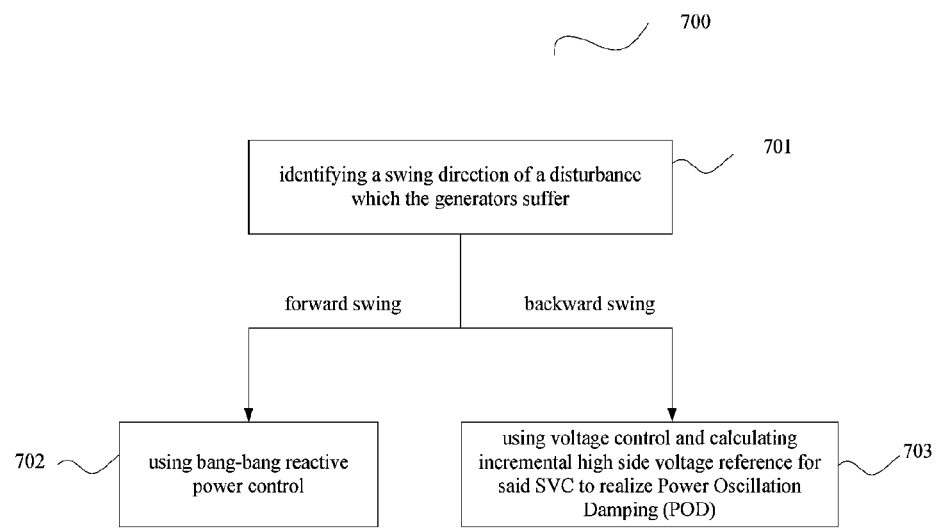
FIG. 7 shows the third control mode of the control method of the third mode for improving dynamic performance of the power plant according to another embodiment of the present invention.

FIG. 7 shows the third control mode of the control method for improving dynamic performance of the power plant according to another embodiment of the present invention. The method 700 comprises the steps of the following.

At the step 701, the method 700 identifies a swing direction of a disturbance which the generators suffer.

When there is a forward swing, the method 700 proceeds to the step 702. At the step 702, using bang-bang reactive power control for the SVC when the power plant is under the disturbance of a forward swing. The first swing is the most important one of the forward swings. When the system suffers the first swing (corresponding to Zone 1 and Zone 4 as shown in FIG. 6), the method 700 uses the reactive power control model, i.e. bang-bang reactive power control to synchronize the generator. In control theory, a bang-bang control (on-off control), is implemented by a feedback controller that switches abruptly between two states. In some embodiments, the two states are the maximum capacitive reactive power state and the other is the maximum inductive reactive power state. And the reactive power references will be decided according to the operation condition of generator by using equation (13):

$$Q^*_{SVC} = \begin{cases} Q_{SVC\_C}, (\omega - \omega^*) > 0 \text{ and } P_{Gen} \geq 0 \\ Q_{SVC\_L}, (\omega - \omega^*) > 0 \text{ and } P_{Gen} < 0 \end{cases} \quad \text{Equation (13)}$$

wherein ω-ω* represents the difference between generator actual speed and the reference speed, $Q_{SVC\_C}$ represents the maximum capacitive reactive power of the SVC, $Q_{SVC\_L}$ represents the maximum inductive reactive power of the SVC, $Q^*_{SVC}$ represents the reactive power reference of the SVC.

When there is a backward swing, the method 700 proceeds to the step 703. At the step 703, the method uses voltage control and calculating incremental high side voltage reference for said SVC to realize Power Oscillation Damping (POD) when the generators are under disturbance of backward swing. The Power Oscillation Damping (POD) component, which is corresponding to the new incremental voltage reference $\Delta V^{*'}_H$, can be calculated through transfer function as illustrated by FIG. 8.

Figure 8:
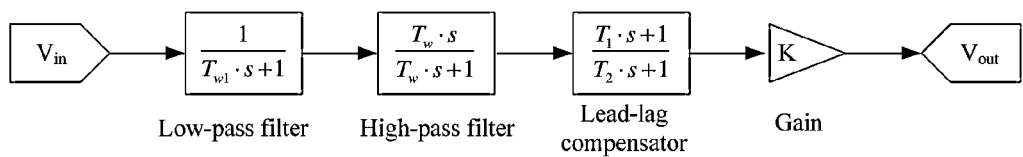
FIG. 8 illustrates the transfer function for POD according to some embodiments of the present invention.

FIG. 8 illustrates the transfer function for POD according to some embodiments of the present invention. Wherein $T_w$, $T_{w1}$, $T_1$ and $T_2$ are time constants, K is the proportional coefficient; the parameter settings can be adjusted in order to achieve the best damping effect; Vin could be any input that can reflect the oscillation information, e.g. $P_{Gen}$, etc, and $V_{OUT} = \Delta V^{*''}_H$; SVC voltage reference can be calculated by using equation (14).

$$V^{*''}_{SVC} = V^*_H + \Delta V^{*''}_H, (\omega - \omega^*) \leq 0 \quad \text{Equation (14)}$$

In some embodiment, besides SVC control, excitation/PSS system will also contribute to generator stability improvement. The method 700 comprises triggering an excitation system to maintain first stability against the voltage drop during disturbances, which is well known to the skilled in this art. In the designed control strategy, the steady-state feed forward component $V^*_{G\_FF\_i}$ will be kept unchanged. Due to the voltage drop during disturbances, the force excitation will be triggered on to maintain first swing stability which is automatically realized by excitation system.

In some embodiment, during backward swings, additional POD component can be added into generator terminal voltage references for excitation systems by using transfer function as shown in FIG. 8 in order to further improve the damping torque. The parameter settings can be adjusted in order to achieve the best damping effect.

The invention also provides an apparatus to implement various embodiments of the method of the first aspect of the invention. The controller comprises: an obtaining module configured to obtain the required input parameters for control of said generators and SVC; a determining module configured to determine a control mode of the generators and the SVC; a calculating module configured to calculate the control references based on the input parameters and the control mode of the generators and the SVC; and a controlling module configured to control the generators and/or the SVC according to the control references.

Wherein the control mode of the controller comprises: a first control mode to realize unity power factor operation of multiple generator units with different operating points; a second control mode for power plant dynamic reactive power regulation without undesired internal reactive power consumption; a third control mode for improving the transient stability of the power plant under system disturbances.

The first control mode and the second control mode can be selected by the operator of the power plant according to the dispatch requirement from the utility. The third control mode will be triggered automatically whenever a system disturbance is detected. After disturbance clearance, the controller will return back to the previous control mode.

In some embodiments, when the controller is under the first control mode, the controlling module configured to use said SVC to control the high side voltage of the unit transformer according to the high side voltage reference from high level control centers of the power system; the calculating module configured to: calculate the feed forward components for terminal voltage references $V^*_{G\_FF\_i}$ of different generator units based on the same high side voltage reference for SVC and calculate feedback components for terminal voltage references of different generator units based on closed-loop control to remove potential measurement errors or parameter errors; and the controlling module configured to use the excitation systems of said generators to control the terminal voltage of generator units according to the terminal voltage references.

In some embodiments, when the controller is under the first control mode, for the closed-loop control, the calculating module further configured to: get an output which inputs to PI block according to the i-th generator reactive power $Q_{Gen\_i}$ and the i-th generator reactive power reference $Q^*_{Gen\_i}$; and output the feed back components for terminal voltage references of the i-th generator unit $V^*_{G\_FB\_i}$ from PI block to an adder for combining the feed forward components for terminal voltage reference of the i-th generator unit $V^*_{G\_FF\_i}$ and the feed back components for terminal voltage reference of the i-th generator unit $V^*_{G\_FB\_i}$ to form a new voltage reference of the i-th generator unit $V^*_{G\_i}$.

In some embodiments, when the controller is under the second control mode, the calculating module configured to: determine the reactive power reference of the power plant according to the demand of the power system and determine the respective reactive power reference of the generators and the SVC; and the controlling module configured to use the SVC to control the high side voltage of unit transformer to respond to the SVC reactive power reference and use the excitation systems of said generators to control the terminal voltage of generator units to respond to the generators reactive power reference.

In some embodiments, when the calculating module further configured to: calculate an available reactive power capacity of the power plant which includes generators and SVC; and limit the power plant reactive power output reference according to the reactive power available capacity.

In some embodiments, the calculating module further configured to: identify whether the SVC is able to meet the power plant reactive power reference; calculate SVC reactive power reference if the SVC can meet the power plant reactive power reference alone; and calculate generator reactive power references and SVC reactive power reference if the SVC can not meet the power plant reactive power reference alone.

In some embodiments, when the controller is under the third control mode, the obtaining module configured to identify a swing direction of a disturbance which the generators suffer; and the controlling module configured to: use bang-bang reactive power control for the SVC when the power plant is under the disturbance of a forward swing and use voltage control for said SVC to realize Power Oscillation Damping (POD) when the generators are under disturbance of backward swing.

In some embodiments, when the controller is under the third control mode, said controlling module configured to add additional POD components into generator terminal voltage references for excitation systems in order to improve the damping torque during backward swings.

It will be appreciated that an embodiment of the method according to the first aspect of the invention may be implemented on a computing device capable of retrieving the electrical quantity of the power transmission system. Embodiments of the apparatus according to the second aspect of the invention may be implemented by circuitry comprising electronic components, integrated circuits (IC), application specific integrated circuits (ASIC), field programmable gate arrays (FPGA), complex programmable logic devices (CPLD), or any combination thereof. Any circuitry may, at least in part, be replaced by processing means, e.g., a processor executing appropriate software.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method for controlling at least one generator and a Static Var Compensator (SVC) to improve dynamic performance of a power plant, the method comprising:
   obtaining one or more required input parameters for control of said at least one generator and the SVC;
   determining a control mode of the at least one generator and the SVC;
   calculating one or more control references based on the one or more required input parameters and the control mode of the at least one generator and the SVC; and
   controlling the at least one generator and/or the SVC according to the one or more control references;

a first control mode to realize a unity power factor operation of multiple generator units with different operating points;

a second control mode for regulating a power plant dynamic reactive power without undesired internal reactive power consumption; and a third control mode for improving a transient stability of the power plant under system disturbances;

wherein the first control mode comprises:

using said SVC to control a high side voltage of a unit transformer according to a high side voltage reference from high level control centers of a power system;

calculating a feed forward component for terminal voltage references of different generator units based on a same high side voltage reference for SVC;

calculating feedback components for terminal voltage references of different generator units based on a closed-loop control to remove potential measurement errors or parameter errors; and using excitation systems of said at least one generator to control the terminal voltage of the generator units according to the terminal voltage references.

2. The method according to claim 1, wherein the closed-loop control further comprising:

getting an output which inputs to PI block according to an i-th generator reactive power and an i-th generator reactive power reference; and outputting the feedback components for terminal voltage references of the i-th generator unit from PI block to an adder for combining the feed forward components for terminal voltage reference of the i-th generator unit and the feedback components for terminal voltage reference of the i-th generator unit to form a new voltage reference of the i-th generator unit.

3. The method according to claim 1, comprising:

determining a reactive power reference of the power plant according to a demand of a power system by:

calculating an available reactive power capacity of the power plant which includes the at least one generator and the SVC; and limiting a power plant reactive power output reference according to the reactive power available capacity.

4. The method according to claim 1, comprising:

determining a respective reactive power reference of the generators and the SVC by:

identifying whether the SVC is able to meet a power plant reactive power reference;

calculating an SVC reactive power reference if the SVC can meet the power plant reactive power reference alone; and calculating the generator reactive power references and the SVC reactive power reference if the SVC cannot meet the power plant reactive power reference alone.

5. The method according to claim 1, wherein the third method comprising:

identifying a swing direction of a disturbance which the generators suffer;

using bang-bang reactive power control for the SVC when the power plant is under the disturbance of a forward swing; and using voltage control and calculating incremental high side voltage reference for said SVC to realize Power Oscillation Damping (POD) when the generators are under disturbance of a backward swing.

6. The method according to claim 5, further comprising:

adding additional POD components into generator terminal voltage references for excitation systems in order to improve a damping torque during the backward swings.

7. A method for controlling at least one generator and a Static Var Compensator (SVC) to improve dynamic performance of a power plant, the method comprising:

obtaining one or more required input parameters for control of said at least one operator and the SVC;

determining a control mode of the at least one generator and the SVC; calculating one or more control references based on the one or more required input parameters and the control mode of the at least one generator and the SVC; and controlling the at least one generator and/or the SVC according to the one or more control references;

a first control mode to realize a unity power factor operation of multiple generator units with different operating points;

a second control mode for regulating a power plant dynamic reactive power without undesired internal reactive power consumption; and a third control mode for improving a transient stability of the power plant under system disturbances;

the second control mode comprising:

determining a reactive power reference of the power plant according to a demand of a power system;

determining a respective reactive power reference of the at least one generator and the SVC;

using the SVC to control a high side voltage of a unit transformer to respond to the SVC reactive power reference; and using excitation systems of said at least one generator to control the terminal voltage of the at least one generator to respond to the generators reactive power reference.

8. The method according to claim 7, wherein determining the reactive power reference of the power plant according to the demand of the power system further comprising:

calculating an available reactive power capacity of the power plant which includes generators and the SVC; and limiting a power plant reactive power output reference according to the reactive power available capacity.

9. The method according to claim 7, wherein determining the respective reactive power reference of the generators and the SVC further comprising:

identifying whether the SVC is able to meet the power plant reactive power reference;

calculating an SVC reactive power reference if the SVC can meet the power plant reactive power reference alone; and calculating the generator reactive power references and the SVC reactive power reference if the SVC cannot meet the power plant reactive power reference alone.

10. A controller for controlling at least one generator and a Static Var Compensator (SVC) to improve dynamic performance of a power plant, the controller comprising:

at least one of a computing device and circuitry configured to: obtain one or more required input parameters for control of said at least one generator and the SVC;

determine a control mode of the at least one generator and the SVC, calculate one or more control references based on the one or more required input parameters and the control mode of the at least one generator and the SVC, and control the at least one generator and/or the SVC according to the one or more control references;

wherein the control mode of the controller comprises:
a first control mode to realize a unity power factor operation of multiple generator units with different operating points;
a second control mode for regulating a power plant dynamic reactive power without undesired internal reactive power consumption; and
a third control mode for improving a transient stability of the power plant under system disturbances; and
wherein under the first control mode, the at least one of a computing device or circuitry is further configured to:
use said SVC to control a high side voltage of a unit transformer according to a high side voltage reference from high level control centers of a power system,
calculate feed forward components for terminal voltage references of different generator units based on a same high side voltage reference for SVC;
calculate feedback components for terminal voltage references of different generator units based on closed-loop control to remove potential measurement errors or parameter errors, and
use excitation systems of said at least one generator to control a terminal voltage of generator units according to the terminal voltage references.

11. The controller according to claim 10, wherein under the second control mode:
the at least one of a computing device and circuitry is configured to:
determine the reactive power reference of the power plant according to a demand of a power system; and
determine respective reactive power reference of the at least one generator and the SVC,
use the SVC to control a high side voltage of a unit transformer to respond to the SVC reactive power reference; and
use excitation systems of said at least one generator to control a terminal voltage of generator units to respond to the at least one generator reactive power reference.

12. The controller according to claim 10, wherein under the third control mode,
the at least one of a computing device and circuitry is further configured to identify a swing direction of a disturbance which the generators suffer,
use bang-bang reactive power control for the SVC when the power plant is under the disturbance of a forward swing, and
use voltage control for said SVC to realize Power Oscillation Damping (POD) when the generators are under disturbance of a backward swing.

13. The controller according to claim 10, the SVC comprises a Thyristor Controlled Reactor (TCR), a Thyristor Switched Capacitor (TSC), and/or an IGBT/IGCT based Static Synchronous Compensator (STATCOM).

14. The controller according to claim 10, the SVC comprises a Thyristor Controlled Reactor (TCR), a Thyristor Switched Capacitor (TSC), and/or an IGBT/IGCT based Static Synchronous Compensator (STATCOM).

15. The controller according to claim 10, the SVC comprises a Thyristor Controlled Reactor (TCR), a Thyristor Switched Capacitor (TSC), and/or an IGBT/IGCT based Static Synchronous Compensator (STATCOM).

16. The controller according to claim 10, the SVC comprises a Thyristor Controlled Reactor (TCR), a Thyristor Switched Capacitor (TSC), and/or an IGBT/IGCT based Static Synchronous Compensator (STATCOM).

* * * * *